United States Patent [19]

Fremont

[11] 4,308,200
[45] Dec. 29, 1981

[54] EXTRACTION OF CONIFEROUS WOODS WITH FLUID CARBON DIOXIDE AND OTHER SUPERCRITICAL FLUIDS

[75] Inventor: Henry A. Fremont, Wyoming, Ohio

[73] Assignee: Champion International Corporation, Stamford, Conn.

[21] Appl. No.: 168,443

[22] Filed: Jul. 10, 1980

[51] Int. Cl.³ ............................ C09F 3/00; C09F 1/00
[52] U.S. Cl. .................................. 260/110; 260/97.7
[58] Field of Search .............................. 260/110, 97.7

[56] References Cited

U.S. PATENT DOCUMENTS

| | | | |
|---|---|---|---|
| 1,762,785 | 6/1930 | Little | 260/110 |
| 2,388,412 | 11/1945 | Hixson et al. | 260/97.6 |
| 3,969,196 | 7/1976 | Zosel | 203/49 |

Primary Examiner—H. S. Cockeram
Attorney, Agent, or Firm—Evelyn M. Sommer

[57] ABSTRACT

Disclosed is a process for extraction of coniferous woods, such as pine, with supercritical fluids to recover tall oil and turpentine, or components thereof. Gases such as carbon dioxide, nitrous oxide, nitrogen, and lower alkanes or lower alkenes at temperatures above critical and pressures of about 100 psi above critical; i.e., supercritical fluids, are contacted with subdivided wood. The extracted wood is suitable for pulping and subsequent papermaking. The extract-bearing fluid is preferably stripped of the extracts by reducing the pressure in stages, each pressure reduction effecting removal of extracts of a narrowly-defined molecular weight range. The fluid is recompressed and recycled.

9 Claims, 1 Drawing Figure

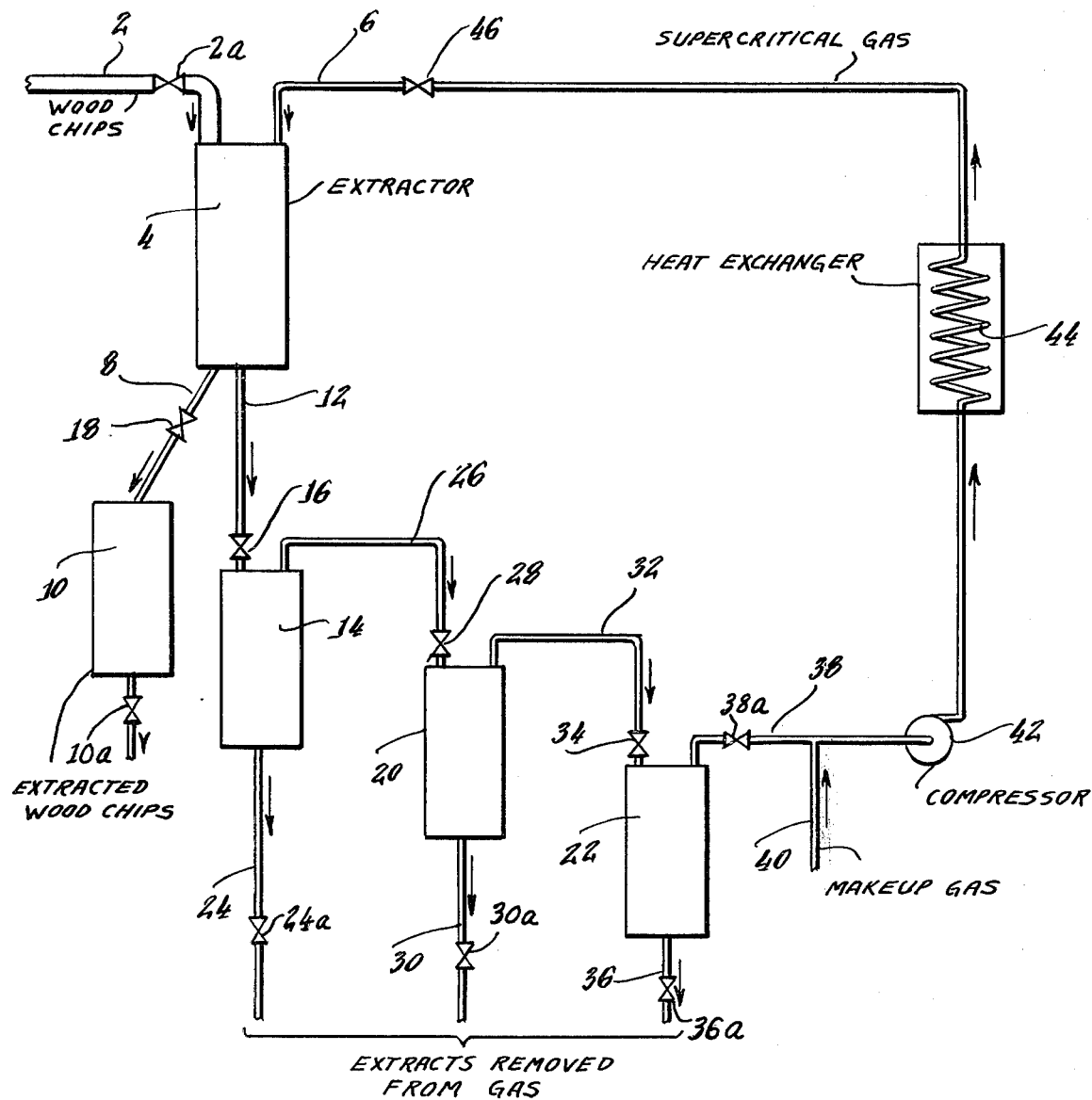

EXTRACTION OF CONIFEROUS WOODS WITH FLUID CARBON DIOXIDE AND OTHER SUPERCRITICAL FLUIDS

BACKGROUND OF THE INVENTION

The present invention relates to the extraction of organic substances such as tall oil and turpentine or the components thereof from coniferous woods.

The removal of organic material from coniferous woods, especially those woods used in pulping operations, is important not only because of the value of the extracts, but also because of the opportunity it offers for improving the quality of the products made from pulps free of these materials. Among the procedures which have been suggested for removing these materials, is extraction with low molecular weight hydrocarbons, such as butane, as taught in U.S. Pat. No. 1,762,785 to Arthur D. Little. According to that procedure, a liquefied, normally-gaseous extractant is contacted with a coniferous wood under moderate temperatures and pressures. Removal of the extract requires heating and distillation. The extracted organic materials can be adversely affected during separation into their component parts. Further degrees of purification can also be affected. For example, crude tall oil, as normally removed from coniferous woods, is composed principally of rosin acids and fatty acids and separation of the two components is economically desirable. In U.S. Pat. No. 2,388,412, there is disclosed a process for extracting fatty acids from tall oil by contacting it with a liquid, normally-gaseous hydrocarbon at elevated temperatures and pressures.

Typically, as presently conducted, the extraction and recovery of tall oil and turpentine require the use of conditions which can cause degradation of either the extracts or the extracted wood.

SUMMARY OF THE INVENTION

The present invention provides an improved process for extracting tall oil and turpentine or their components from coniferous woods in a simple economic manner without adversely affecting the wood or the extracts.

Briefly, the invention comprises: (a) subdividing a coniferous wood; and (b) contacting the subdivided coniferous wood with a gaseous extractant in the form of a supercritical fluid maintained at a temperature above the critical temperature of the gas and a pressure of from about 50 to 250 psi greater than the critical pressure of the gas, for a period of time effective to extract the major portion of the extracts therefrom.

BRIEF DESCRIPTION OF THE DRAWING

The present invention will be further described and the advantages will become more apparent from a reading of the following detailed description, especially when read in light of the attached drawing wherein:

The FIGURE schematically shows a process sequence wherein wood chips are contacted with a supercritical fluid and the extracted materials are then stripped from the extractant fluid by sequentially reducing the pressure on the fluid in stages.

DETAILED DESCRIPTION

The critical features of the instant invention are the use of a supercritical fluid extractant and of varying the pressure to obtain various extracts.

"Supercritical fluids" is the term used to describe those fluids which have been compressed beyond their critical pressure and also heated above their critical temperature. Gases are most suitable, and particularly carbon dioxide since it is nonhazardous, nontoxic, and inexpensive. Other inorganic gases and organic gases can also be used, examples being nitrogen, nitrous oxide; lower alkanes such as methane, ethane, propane, butane; and lower alkenes such as propylene, and the like. This listing is representative only and is not meant to be exhaustive as there are other gases which can also be compressed and heated beyond their critical points to give supercritical fluids which are excellent extractants or solvents. As used herein, the word "fluid" means a supercritical fluid.

U.S. Pat. No. 3,969,196 to Zosel contains a discussion of various parameters of importance in supercritical extraction procedures. While the extraction of turpentine and tall oil from coniferous woods is not dealt with, the disclosure of this patent is specifically incorporated by reference because it will help provide an appreciation of some of the empirical relationships important to supercritical extraction in general.

The instant process is applicable to all coniferous woods which contain tall oil and turpentine and their component elements; i.e., rosin acids, fatty acids, and terpenes, and is not otherwise restricted. Typical among these are pines such as Loblolly, Longleaf, and Slash, and firs such as Douglas, White, and Red. The process is particularly effective in extracting tall oil and turpentine from wood chips and simultaneously preparing the chips for pulping. The pulp formed from the extracted wood can be used for paper making.

The major advantages in extracting, as disclosed herein, prior to pulping and subsequent papermaking is the saving in pulping chemicals, reduction in fouling of pulping equipment, and reduction in toxic effluents from the plant. More specifically, removal of the terpenes, rosin acids, and fatty acids substantially reduces the possibility of soap formation during pulping thereby eliminating the need to skim off such soaps and eliminating the fouling which occurs when such soaps settle on the heated surfaces of certain of the pulping equipment. In addition, elimination of such soap formation results in a lesser amount of chemicals required during pulping, and a consequent savings in cost. Also, the terpenes which are toxic are removed before they can get into the plant effluents and present a pollution problem.

The wood is preferably subdivided to improve extraction efficiency. An advantage of the invention, however, is that the subdivisions can be quite large and are preferably of a size which can be employed in conventional pulping procedures. Typically, the wood will be formed into chips which are preferably of an average size of $\frac{3}{4}'' \times \frac{1}{2}'' \times \frac{1}{8}''$. The wood can be subdivided by an suitable means, with a conventional wood chipper being preferred. Sawdust and planer mill shavings can be employed to the extent compatible with the ultimate end use of the extracted wood.

The FIGURE shows a simplified, schematic representation of one embodiment of the process of this invention. According to this process scheme, wood chips are charged via line 2 and valve 2a into extractor 4 for contact with a supercritical extractant charged into the extractor 4 through line 6. The wood chips are contacted with the supercritical fluid for a time effective to remove a major amount of the tall oil and the turpentine from the wood.

The fluid in the extractor 4 will be above the critical temperature and the critical pressure for the gas. Superior results have been achieved according to the present invention by employing temperatures of from 1° to 25° C. above the critical temperature and pressures of from 50 to 250 psi above the critical pressure. Preferably, the temperature will be less than 10° C. above critical and the pressure will be about 100 psi above critical. In the exemplary case of carbon dioxide, for which the critical pressure is 1073 psi at the critical temperature of 31° C., typical preferred conditions will be a pressure of about 1175 psi and a temperature of about 40° C. Contact times of from about 10 seconds to about two minutes are typical for carbon dioxide, although longer contact times can be utilized if the wood chips are of a larger size and/or more complete extraction is desired.

After extraction, the wood is removed from extractor 4 via line 8 which passes it to vessel 10 for further processing such as pulping, if desired, or simply holding for later use.

The extract, as such, can be recovered from extractor 4, or if desired it can be further processed as described below to obtain a plurality of fractions. It has been noted that the various components of the extract such as the terpenes, fatty acids, and rosin acids are soluble only as a function of pressure. As the pressure is dropped while still maintaining the extractant as a supercritical fluid, it is possible to obtain a particular fraction desired at a particular pressure level. By way of example, it is possible to have two fractions; turpentine and tall oil; three fractions; terpenes, fatty acids, and rosin acids; or a plurality of fractions wherein the individual terpenes, such as $\alpha$-pinene, $\beta$-pinene, and dipentene, are recovered, as well as the individual fatty acids; such as myristic, stearic, oleic, linoleic, linolenic, and/or palmitic acids, and rosin acids; such as abietic and/or dehydroabietic acids.

The invention will be further described in connection with recovering three fractions utilizing the apparatus system set forth in the FIGURE. It will be understood, however, that it is possible to recover the individual fractions in a single extractor 4 after removal of the extracted wood chips, by lowering the pressure in three stages to the pressure at which each fraction becomes insoluble in the supercritical fluid as is illustrated in the Example.

The extractant fluid, now a solution laden with extract comprising tall oil and turpentine is removed from extractor 4 via line 12 and passed to vessel 14 where separation of the extract from the extractant fluid is begun. Removal of the extractant fluid solution and the wood from extractor 4 is done stagewise, with the fluid being removed first by opening valve 16 on line 12. When the fluid has been substantially exhausted, valve 18 on line 8 is opened to permit passage of the subdivided wood from the extractor 4 to vessel 10 and therefrom through valve 10a.

The FIGURE shows a series of vessels 14, 20, and 22 for separating the extracted materials from the fluid extractant. The extractant, containing extracted wood materials comprising tall oil and turpentine components, is sequentially fed to the vessels, each maintained at a lower pressure than the immediately preceding vessel. The effect of pressure relief in each vessel is to enable the separation of the components according to molecular weights, functionality, and steric effects.

Upon entering the first vessel 14 after the extractor 4, the highest molecular weight components are separated and drawn off via line 24. The remaining extractant fluid solution is then fed via line 26 to vessel 20 by opening valve 28. Vessel 20 is maintained at a lower pressure than vessel 14, so that the next lower molecular weight fraction can be drawn off via line 30. The residual extractant fluid solution is fed via line 32 to the next vessel 22 by opening valve 34. In vessel 22, components of still lower molecular weight are drawn off by line 36. Lines 24, 30, and 36 are suitably valved, 24a; 30a, and 36a, to permit drawing off of the fractions. The remaining extractant fluid can then be recycled to the extractor 4 by means of line 38 through valve 38a to which make up fluid can be added from line 40. The fluid is compressed by suitable means 42 and brought to the desired temperature by heat exchanger 44. The extractor 4 can be charged by opening valve 46. In this manner, a highly effective extraction process is provided and is coupled with an efficient means of separating the extracted compounds according to their molecular weight.

The temperature and pressures for the various separation stages can be selected based on empirical determinations of the most suitable conditions for recovering the extracts in desired purities. If desired, further sequential separation stages can be employed to obtain narrower molecular weight fractions. In addition, distillation of other like procedures can be employed in combination with the present separation scheme where desired.

The following example is presented for the purpose of further illustrating and explaining the present invention and is not to be taken as limiting in any regard. Unless otherwise indicated, all parts and percentages are by weight.

EXAMPLE

This example describes the extraction of pine chips with supercritical carbon dioxide and the recovery of tall oil and turpentine in highly purified form.

Pine logs are debarked and subdivided in a chipper into chips of average size of about $\frac{3}{4}'' \times \frac{1}{2}'' \times \frac{1}{8}''$. Twenty pounds of pine chips (50% moisture) are fed to an extractor where they are contacted with 29 pounds of fluid carbon dioxide at a temperature of 40° C. and a pressure of 1175 psi. The contact is maintained for one minute, after which the chips and the carbon dioxide extractant solution are drawn from the extractor. The pine chips are substantially freed of tall oil and turpentine, having less than 1% of the original tall oil and less than 1% of the turpentine originally present. The carbon dioxide extractant solution is fed to a first pressure separation vessel maintained at a temperature of 40° C. and a pressure of 1145 psi wherein 0.24 pounds of a rosin acid fraction having an average molecular weight of about 300 precipitates from the fluid solution. The remaining carbon dioxide extractant solution is then fed to a second pressure separation vessel maintained at a temperature of 38° C. and a pressure of 1115 psi, wherein 0.11 pounds of a fatty acid fraction having a molecular weight range of from about 220–290 is precipitated from the fluid solution. The remaining carbon dioxide solution is fed to a third pressure separation vessel maintained at a temperature of 34° C. and a pressure of 1085 psi wherein 0.037 pounds of a turpentine (terpene) fraction is removed. The material has a molecular weight of from 130 to 156.

After separation of these desired fractions from the carbon dioxide extractant, the residual carbon dioxide solution is recycled to the extractor. Prior to recharging the extractor at 1175 psi, two pounds of carbon dioxide are added to make up for that lost in processing and the temperature of the gas is brought to 40° C.

The above disclosure is intended to teach the person of ordinary skill in the art how to perform the present invention and is not intended to detail all of the obvious modifications and variations of it which will be apparent to those skilled in the art upon reading. It is intended, however, to include all such modifications and variations within the invention the scope of which is defined by the following claims.

What is claimed is:

1. A process for extracting tall oil and turpentine or components thereof from a coniferous wood which comprises:
    (a) subdividing a coniferous wood; and
    (b) contacting the subdivided coniferous wood with carbon dioxide maintained at a temperature above its critical temperature and a pressure of from about 50 to 250 psi greater than its critical pressure, for a period of time sufficient to extract the major portion of the turpentine and tall oil or components thereof.

2. A process according to claim 1 wherein the carbon dioxide is maintained at a pressure of about 100 psi above the critical pressure for a time period of at least 10 seconds.

3. A process according to claims 1 or 2 wherein the temperature during contact with the wood is about 40° C.

4. A process according to claim 1 which includes the further step of partially releasing the pressure on the fluid containing the extract to a first supercritical level to precipitate out a first high-molecular weight fraction.

5. A process according to claim 4 which includes the further step of partially releasing the pressure on the fluid maintained at the first supercritical level to further reduce the pressure to a second supercritical level and to precipitate out a second, lower-molecular weight fraction.

6. A process according to claim 5 which includes the further step of partially releasing the pressure on the fluid maintained at the second supercritical level to further reduce the pressure to a third supercritical level and to precipitate out a third, lowest-molecular weight fraction.

7. A process according to claim 6 including the further step of recompressing the fluid to a higher critical pressure while maintaining the temperature above the critical value for the carbon dioxide after precipitating off the desired molecular weight fraction.

8. A process according to claim 7 wherein the carbon dioxide is maintained at a pressure of about 100 psi above the critical pressure for a time period of from about 10 seconds to about two minutes.

9. A process according to claim 8 wherein the temperature during contact with the wood is about 40° C.

* * * * *